United States Patent
Vitomir

(12)
(10) Patent No.: US 6,465,405 B1
(45) Date of Patent: *Oct. 15, 2002

(54) PAINT STRIPPER COMPOSITIONS

(75) Inventor: Sergio Vitomir, New Westminster (CA)

(73) Assignee: Napier Environmental Technologies, Inc., Annacis Business Park Delta (CA)

( * ) Notice: Subject to any disclaimer, the term of this patent is extended or adjusted under 35 U.S.C. 154(b) by 175 days.

This patent is subject to a terminal disclaimer.

(21) Appl. No.: 09/637,760

(22) Filed: Aug. 11, 2000

Related U.S. Application Data

(63) Continuation of application No. 09/356,437, filed on Jul. 19, 1999, now Pat. No. 6,200,940.

(51) Int. Cl.⁷ .............................. C11D 9/04; C09D 9/04
(52) U.S. Cl. ..................... 510/206; 510/201; 510/202; 134/38; 134/40
(58) Field of Search .................... 510/201, 202, 510/470, 382, 206; 134/40, 38; 252/513

(56) References Cited

U.S. PATENT DOCUMENTS

| | | | |
|---|---|---|---|
| 3,355,385 A | 11/1967 | Mackley | 252/104 |
| 3,979,219 A | 9/1976 | Chang et al. | 106/271 |
| 4,120,810 A | 10/1978 | Palmer | 252/153 |
| 4,269,724 A | 5/1981 | Hodson | 252/171 |
| 4,683,157 A | 7/1987 | Mosser et al. | 428/65 |
| 4,732,695 A | 3/1988 | Franisco | 252/162 |
| 4,812,255 A | 3/1989 | Suwala | 252/142 |
| 5,015,410 A | 5/1991 | Sullivan | 252/166 |
| 5,106,525 A | 4/1992 | Sullivan | 252/162 |
| 5,215,675 A | 6/1993 | Wilkins et al. | 252/100 |
| 5,319,055 A | 6/1994 | Sperry et al. | 528/49 |
| 5,387,363 A | 2/1995 | Distaso | 252/163 |
| 5,403,517 A | 4/1995 | Horinishi et al. | 252/551 |
| 5,405,548 A | 4/1995 | Distaso | 252/170 |
| 5,411,678 A | 5/1995 | Sim | 252/548 |
| 5,425,893 A | 6/1995 | Stevens | 252/166 |
| 5,427,710 A | 6/1995 | Stevens | 252/166 |
| 5,454,985 A | 10/1995 | Harbin | 252/558 |
| 5,518,661 A | 5/1996 | Langford et al. | 252/364 |
| 5,542,986 A | 8/1996 | Distaso | 134/38 |
| 5,569,410 A | 10/1996 | Distaso | 510/202 |
| 5,728,666 A | 3/1998 | Vitomir | 510/203 |
| 5,792,274 A | 8/1998 | Tanabe et al. | 134/1.3 |
| 6,200,940 B1 * | 3/2001 | Vitomar | |

FOREIGN PATENT DOCUMENTS

| | | | |
|---|---|---|---|
| EP | 0 497 130 A2 | 8/1992 | C09D/9/04 |
| EP | 0 846 735 A1 | 6/1998 | C09D/9/00 |
| EP | 0 903 381 A2 | 3/1999 | C09D/9/00 |
| ES | 2008593 | 7/1935 | |

* cited by examiner

*Primary Examiner*—Gregory E. Webb
(74) *Attorney, Agent, or Firm*—Darby & Darby

(57) ABSTRACT

The present invention is directed to a paint stripping composition comprising (a) from about 0.5 to about 50% by weight of an aromatic alcohol, such as benzyl alcohol; (b) from about 0.5 to about 20% by weight of malic acid; and (c) from about 15 to about 60% by weight of water. The pH of the composition broadly ranges from about 2 to about 3. The stripping composition of the present invention is free of chlorinated solvents, environmentally safe, and user-friendly. It is non-corrosive or only slightly corrosive to substrates, non-flammable, non-toxic, flow odor, and fully biodegradable. A method of preparing the paint stripping composition is also provided.

22 Claims, No Drawings

PAINT STRIPPER COMPOSITIONS

This a continuation of application Ser. No. 09/356,437, filed Jul. 19, 1999, now U.S. Pat. No. 6,200,940. This prior application is hereby incorporated herein by reference, in its entirety.

FIELD OF THE INVENTION

This invention relates to paint stripper compositions containing malic acid and method of preparing the same.

BACKGROUND OF THE INVENTION

For decades, strong acids and halocarbon solvent-based compositions were employed in stripping various protective coatings from metal and other substrates. Increased awareness of the detrimental impact of such paint strippers on health and environment, in recent years, resulted in government legislative bodies all over the world restricting and/or prohibiting the user of these materials. Furthermore, these paint strippers after damaged the substrates to which they were applied.

Wilkins et al., U.S. Pat. No. 5,215,675 provides an aqueous stripping composition based on a soluble ester such as ethyl lactate and a peroxide such as hydrogen peroxide.

Distaso, U.S. Pat. Nos. 5,405,548 and 5,542,986 describe the use of methylbenzyl formate or benzyl formic acid in an aqueous-based system for stripping various protective coatings.

However, these prior art compositions suffer from several disadvantages, namely, low solvency (low efficacy), high cost, corrosiveness, narrow range of stability, and extremely strong, unpleasant, and irritating odor.

SUMMARY OF THE INVENTION

The present invention is directed to a paint stripper-composition comprising (a) from about 5 to about 50% by weight of aromatic alcohol; (b) from about 0.5 to about 20% by weight of malic acid; and (c) from about 15 to about 60% by weight of water. The pH of the composition broadly ranges from about 2 to about 3. The paint stripper composition of the present invention is free of chlorinated solvents, environmentally safe and user-friendly. It is also non-corrosive or only slightly corrosive to substrates, non-flammable, non-toxic, low odor, and fully biodegradable.

Another embodiment of the invention is a method of preparing the composition comprising dispersing (i) a polar phase containing (a) from about 0.5 to about 20 parts by weight of malic acid and (b) from about 15 to about 60 parts by weight of deionized or distilled water into (ii) a non-polar phase containing from about 5 to about 50 parts by weight of aromatic alcohol.

Yet another embodiment of the invention is a method for removing paint or a coating from a substrate comprising applying a paint or coating removing effective amount of the paint stripper composition of the present invention.

DETAILED DESCRIPTION OF THE INVENTION

The paint stripper composition of the present invention comprises (a) from about 5 to about 50% by weight of (i) an aromatic alcohol having the formula

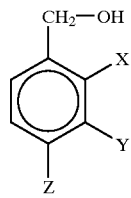

where X, Y, and Z are all hydrogen or two hydrogens and a methyl, (ii) an aromatic alcohol having the formula

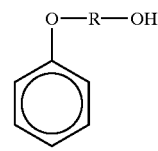

where R is ethylene, propylene, or isopropylene, or (iii) a mixture thereof, (b) from about 0.5 to about 20% by weight of malic acid; and (c) from about 15 to about 60% by weight of water based upon 100% weight of total composition. The composition preferably comprises (a) from about 25 to about 35% by weight of aromatic alcohol; (b) from about 0.5 to about 5% by weight of malic acid; and (c) from about 20 to about 50% by weight of water. More preferably, the composition comprises from about 0.5 to about 3% by weight of malic acid.

The composition typically has a pH of from about 2 to about 3.

Suitable aromatic alcohols include, but are not limited to, benzyl alcohol, phenoxy propanol, phenoxy ethanol, and any combination of any of the foregoing. Preferably, the aromatic alcohol is benzyl alcohol.

The malic acid of the composition initiates removal of paint or a coating on a substrate. in particular, compositions of the present invention have been found to be very effective at removing antifouling paint from various substrates, including, but not limited to, polyester and metallic substrates. Malic acid is also non-corrosive to metallic substrates.

Additionally, malic acid is a good fluxing agent. Hence, the paint stripper composition of the present invention spreads very well on solid surfaces, which improves the efficacy of stripping by reducing the waiting time for the paint to start lifting.

The presence of deionized water in the composition enhances the overall stripping effectiveness of the composition. When the protective coating on a substrate to which the composition is applied is polar, e.g., polyurethanes, the presence of a solvent with a high dielectric constant such as water ($\in$=80.20@20° C.) has a positive effect in separating charged areas, thus allowing other solvents in the composition to soften the coating.

The water preferably contains no more than about 1% by weight of dissolved inorganic salts and preferably less than about 200 ppm. Distilled or deionized water having an electrical conductivity less than about 400 mho/cm is particularly preferred. Failure to follow the above specified water parameters may result in decomposition of peroxides in the composition, which may retard the stripping performance of the composition.

The composition may also include an aromatic ether having the formula $R^1$—$CH_2$—O—$CH_2$—$R^2$ where $R^1$ and $R^2$ are hydrogen and phenyl or both phenyl. A preferred aromatic ether is benzyl ether. The composition preferably includes from about 1 to about 30% by weight of aromatic ether based upon 100% weight of total composition. The weight ratio of aromatic alcohol to aromatic ether is preferably from about 3:1 to about 1:1 and more preferably about 2.5:1.

An aromatic hydrocarbon cosolvent may be included in the composition. The aromatic hydrocarbon cosolvent may be a mixture of one or more aromatic hydrocarbon solvents. The aromatic hydrocarbon cosolvent improves the stability of the composition thereby increasing the shelf life of the composition. It also improves the rheological properties of the composition and the speed of penetration of the composition into paints and coatings. Furthermore, the aromatic hydrocarbon solvent reduces the surface tension and evaporation rate of the composition. Preferably, the aromatic hydrocarbon solvent has a flash point above about 150° F. and more preferably above about 190° F. Naphthalene depleted aromatic hydrocarbons are preferable since naphthalene has a noxious odor and is hazardous. Suitable aromatic hydrocarbon cosolvents, include, but are not limited to, Aromatic 200ND available from Exxon Chemicals of Houston, Tex.: Solvesso 200 available from Esso Corporation of Toronto, Canada; metaphenoxy benzyl alcohol; and any combination of any of the foregoing. The composition typically comprises from about 0.5 to about 40% by weight and more preferably from about 1 to about 30% by weight of aromatic hydrocarbon cosolvent based upon 100% weight of total composition. The weight ratio of water to aromatic hydrocarbon cosolvent is typically from about 30:1 to about 1.5:1 and preferably from about 20:1 to about 1.7:1.

The composition may include a second hydroxycarboxylic acid having the empirical formula $C_nH_m(COOH)_xOH_y$ where n, x, and y are independently integers greater than 1 and m is equal to $2n+2-(x-y)$. A preferred hydroxycarboxylic acid is glycolic acid. The inventor has discovered that the combination of malic acid and glycolic acid in a paint stripper composition of the present invention greatly enhances removal of a antifouling paint from a substrate. Preferably the composition contains from about 0.5 to about 10% by weight and more preferably from about 0.5 to about 3.5% by weight of the second hydroxycarboxylic acid based upon 100% weight of total composition.

A peroxide generating agent may also be included in the composition. Preferably, the peroxide generating agent is hydrogen peroxide, magnesium peroxide, or any combination of any of the foregoing. On most metal surfaces, including aluminum and its alloys, a decomposition reaction of hydrogen peroxide takes place, generating an intermediate nascent oxygen which associates instantaneously, producing gaseous oxygen and water. The oxygen accelerates the stripping process by initiating the lifting of the softened protective coating and allowing new quantities of the paint stripping composition to penetrate the metal-coating interface.

The composition typically comprises from about 0.5 to about 30% by weight and preferably from about 0.5 to about 10% by weight of peroxide generating agent based upon 100% weight of total composition. Paint stripper compositions of the present invention which contain hydrogen peroxide preferably have a pH less than about 3. At a pH above 3, the hydrogen peroxide begins to decompose. The malic acid in the composition stabilizes the composition and prevents the hydrogen peroxide from decomposing. The malic acid also lowers the pH of the composition, which further stabilizes the hydrogen peroxide.

The composition may include other adjuvants such as coupling agents, stabilizers, chelating agents, corrosion inhibitors, rheology modifying agents, evaporation retardants, solubilizer-emulsifiers, and any combination of any of the foregoing.

Suitable coupling agents include, but arc not limited to, alkylene glycols, dimethylsulfoxide (DMSO), and any combination of any of the foregoing. A preferred coupling agent is propylene glycol. The composition typically comprises from about 0.5 to about 5% by weight of coupling agent based upon 100% weight of total composition.

Suitable stabilizers include, but are not limited to, acetanilide. The composition typically comprises from about 0.01 to about 3% by weight of stabilizer based upon 100% weight of total composition.

Suitable chelating agents include, but are not limited to, phosphonic acids, such as bis(hexamethylene)triamino penta(methylenie phosphonic) acid and phosphoric acid; citric acid; ethylenediaminetetraacetic acid (EDTA); and any combination of any of the foregoing. The composition typically comprises from about 0.5 to about 4% by weight of chelating agent based upon 100% weight of total composition.

Suitable corrosion inhibitors include, but are not limited to, benzotriazoles, such as 2-mercaptobenzothiazole, toluoltriazole, benzotriazole, 2(3H)-benzothiazolethioine; borates; and any combination of any of the foregoing. The composition typically comprises from about 0.3 to about 3% by weight of corrosion inhibitor based upon 100% weight of total composition.

Suitable rheology modifying agents include, but are not limited to, hydroxypropyl cellulose, hydroxypropyl methyl cellulose, hydroxyethyl cellulose, fumed silica, precipitated silica, castor oil, and any combination of any of the foregoing. A preferred rheology modifying agent is hydroxypropyl cellulose. The composition typically comprises from about 0.1 to about 3% by weight of rheology modifying agent based upon 100% weight of total composition.

Suitable evaporation retardants include, but are not limited to, silicone fluid, a water-based wax emulsion, paraffin oil, paraffin wax, and any combination of any of the foregoing. A preferred evaporation retardant is paraffin wax. The composition typically comprises from about 0.1 to about 3% by weight of evaporation retardant based upon 100% weight of total composition.

Suitable solubilizer-emulsifiers include, but are not limited to, fluorinated alkyl esters; polyethoxylated sorbitan ester, such as polyethoxylated sorbitan monolaurate, polyethoxylated sorbitan monopalmitate, polyethoxylated sorbitan monostearate, polyethoxylated sorbitan tristearate, and polyethoxylatcd sorbitan monooleate; trioleate polysorbates; and any combination of any of the foregoing. A preferred solubilizer-emulsifier is polyethoxylated sorbitan monooleate. The composition typically comprises from about 0.1 to about 5% by weight of solubilizer-emulsifier based upon 100% weight of total composition.

Other adjuvants as known to those skilled in the art may also be included in the composition.

The paint stripper compositions of the present invention is prepared by admixing, (i) a polar phase comprising malic acid and deionized or distilled water with (ii) a non-polar phase comprising aromatic alcohol.

The polar phase is prepared by admixing, with continuous mixing, from about 0.5 to about 20 parts by weight of malic acid and from about 15 to about 60 parts by weight of deionized or distilled water. Preferably, from about 0.5 to about 40 parts by weight of aromatic hydrocarbon cosolvent, from about 0.5 to about 10 parts by weight of a peroxide generating agent, and from about 0.5 to about 10 parts by weight of the aforementioned second hydroxycarboxylic acid are added to the polar phase. A coupling agent, emulsifier/solubilizer, stabilizer, and chelating agent may also be added to the polar phase.

Though hydrogen peroxide is commercially available at concentrations up to 70% by weight, the use of 30–35% concentration is preferred. Such concentrations can be achieved by diluting the higher concentration grades of hydrogen peroxide with deionized water.

An aromatic ether, evaporation retardant, corrosion inhibitor, and rheology modifying agent may be added to the non-polar phase. Typically, the non-polar phase comprises from about 10 to about 80 parts by weight and preferably from about 10 to about 50 parts by weight of the paint stripper composition based upon 100 parts by weight of total composition.

The compositions of the present invention are useful in removing and stripping paints, such as oil-based paints, and various other protective coatings, such as epoxies, polysulfides, urethanes, polyurethanes, vinyl esters, alkyls, and acrylics. A paint or coating removing and/or stripping effective amount of the composition is applied to the substrate. When the composition is applied as a paste, the composition is typically applied with a thickness equal to that of the coating to be removed. The stripper composition may need to be applied one or more times to remove one or more coatings from a substrate.

Examples of suitable substrates include, but are not limited to, metallic substrates, such as steel, aluminum, and their alloys; polyester substrates, such as gelcoated substrates; and composites, such as Kevlar® available from E. I. du Pont de Nemours and Company of Wilmington, Del.

Methods of applying the stripper include, but are not limited to, spraying, soaking, immersing, brushing, and the like.

DESCRIPTION OF THE PREFERRED EMBODIMENTS

The following examples illustrate the invention without limitation. All parts and percentages are given by weight unless otherwise indicated.

EXAMPLES 1–6 AND COMPARATIVE EXAMPLES 1A AND 1B

The paint stripper compositions of Examples 1–6 and Comparative Examples 1A and 1B in Table 1 were prepared as follows. All amounts in Table 1 are given in parts by weight. Paraffin wax, benzotriazole, and hydroxypropyl cellulose were added to benzyl alcohol with continuous mixing to form a non-polar mixture. A polar mixture was prepared by admixing malic acid, deionized water, propylene glycol, sorbitan monooleate, an aromatic hydrocarbon cosolvent (Solvesso™), hydrogen peroxide, and glycolic acid. The non-polar mixture was dispersed for about 2 to about 3 hours into the polar mixture to form the paint stripper composition. The paint stripper compositions were stored for 7 days before being tested.

TABLE 1

| Ingredient | Examples | | | | | | Comparative Examples | |
|---|---|---|---|---|---|---|---|---|
|  | 1 | 2 | 3 | 4 | 5 | 6 | 1A | 1B |
| Benzyl Alcohol | 35.00 | 35.00 | 35.00 | 35.00 | 35.00 | 35.00 | 35.00 | 35.00 |
| Solvesso 200 ™[1] | 3.80 | 3.80 | 3.80 | 3.80 | 3.80 | 3.80 | 3.80 | 3.80 |
| Malic Acid | 1.00 | 3.00 | 3.00 | 3.00 | 5.00 | 10.00 |  |  |
| Glycolic Acid |  |  | 0.50 | 3.00 | 0.50 | 5.00 |  | 3.00 |
| Hydrogen Peroxide |  | 0.50 | 0.50 | 0.50 | 0.50 | 5.00 | 10.00 |  |
| Polysorbate Ester | 5.00 | 5.00 | 5.00 | 5.00 | 5.00 | 5.00 | 5.00 | 5.00 |
| Hydroxypropyl Cellulose | 0.25 | 0.25 | 0.25 | 0.25 | 0.25 | 0.25 | 0.25 | 0.25 |
| Propylene Glycol | 5.00 | 5.00 | 5.00 | 5.00 | 5.00 | 5.00 | 5.00 | 5.00 |
| Paraffin Wax | 0.20 | 0.20 | 0.20 | 0.20 | 0.20 | 0.20 | 0.20 | 0.20 |
| Deionized Water | Balance to 100 | | | | | | | |

[1]Solvesso 200 ™ is available from Esso Corporation of Toronto, Canada.

8 aluminum alloy 2024-T3 test panels (4"×5") were primed with MIL-P-85582B (Product No. 44-GN24) Water Borne and topcoated with MIL-C-85285BC (Product No. 03-W-127A) colour 17925, available from Deft Inc. of Lrvine, Calif.

Each paint stripper composition was tested as follows. A thin film of the composition was coated onto the test panel at room temperature (15–20° C). The effectiveness of the composition was evaluated as a percent of removed coating as a function of time. The results are shown in Table 2 below.

TABLE 2

| Paint Stripper Composition | Percentage of Topcoat Removed | Percentage of Primer Removed | Time |
|---|---|---|---|
| Example 1 | 100 | 100 | 5 hours |
| Example 2 | 100 | 100 | 4 hours, 15 minutes |
| Example 3 | 100 | 100 | 3 hours, 45 minutes |
| Example 4 | 100 | 100 | 3 hours, 50 minutes |
| Example 5 | 100 | 100 | 4 hours |
| Example 6 | 80 | 50 | 24 hours |
| Comparative Example 1A | 20 | 0 | 24 hours |
| Comparative Example 1B | 80 | 10 | 24 hours |

EXAMPLE 7

The paint stripper composition in Table 3 below was prepared by the method described in Examples 1–6.

TABLE 3

| Ingredient | % Weight |
|---|---|
| Benzyl Alcohol | 35.00 |
| Solvesso 200 ™ 2 | 5.60 |
| Paraffin Wax | 0.30 |
| Polyethoxylated Sorbitan Monooleate | 0.50 |
| Glycolic Acid | 3.00 |
| Hydroxypropyl Cellulose | 0.50 |
| Hydrogen Peroxide | 0.50 |
| Propylene Glycol | 1.50 |

TABLE 3-continued

| Ingredient | % Weight |
|---|---|
| Malic Acid | 1.20 |
| Water | 51.90 |
| Total | 100.00 |

²Solvesso 200 ™ available from Esso Corporation of Toronto, Canada.

EXAMPLE 8

The paint stripper composition in Table 4 below was prepared by the method described in Examples 1–6.

TABLE 4

| Ingredient | % Weight |
|---|---|
| Benzyl Alcohol | 35.00 |
| Solvesso 200 ™ 3 | 6.60 |
| Paraffin Wax | 0.30 |
| Polyethoxylated Sorbitan Monooleate | 0.50 |
| Hydroxypropyl Cellulose | 0.37 |
| Hydrogen Peroxide | 4.00 |
| Propylene Glycol | 1.50 |
| Malic Acid | 1.00 |
| Water | 50.73 |
| Total | 100.00 |

³Solvesso 200 ™ is available from Esso Corporation of Toronto, Canada.

EXAMPLE 9

The paint stripper composition in Table 5 below was prepared by the method described in Examples 1–6.

TABLE 5

| Ingredient | % Weight |
|---|---|
| Benzyl Alcohol | 35.00 |
| Solvesso 200 ™ 4 | 6.60 |
| Paraffin Wax | 0.30 |
| Polyethoxylated Sorbitan Monooleate | 0.50 |
| Hydroxypropyl Cellulose | 0.50 |
| Propylene Glycol | 1.50 |
| Malic Acid | 1.20 |
| Water | 54.40 |
| Total | 100.00 |

⁴Solvesso 200 ™ available from Esso Corporation of Toronto, Canada.

All patents, applications, articles, publications, and test methods mentioned above are hereby incorporated by reference.

Many variations of the present invention will suggest themselves to those skilled in the art in light of the above detailed description. Such obvious variations are within the full intended scope of the appended claims.

What is claimed is:

1. An aqueous paint stripper composition comprising:

(a) from about 5 to about 50% by weight of an aromatic alcohol selected from from the group consisting of (i) an aromatic alcohol having the formula

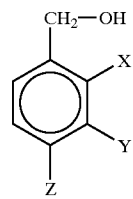

wherein X, Y, and Z are all hydrogen or two hydrogens and a methyl (ii) an aromatic alcohol having the formula

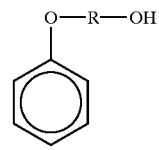

wherein R is ethylene, propylene, or isopropylene, and (iii) mixtures thereof;

(b) from about 0.5 to about 20% by weight of malic acid; and (c) from about 15 to about 60% by weight of water.

2. The composition of claim 1, wherein said aromatic alcohol is benzyl alcohol.

3. The composition of claim 1, wherein said composition comprises from about 25 to about 35% by weight of said aromatic acid.

4. The composition of claim 1, further comprising an aromatic ether having the formula $R^1$—$CH_2$—O—$CH_2$—$R^2$ where $R^1$ and $R^2$ are hydrogen and phenyl or both phenyl.

5. The composition of claim 1, further comprising an aromatic hydrocarbon cosolvent.

6. The composition of claim 1, wherein said aromatic hydrocarbon cosolvent is a naphthalene depleted aromatic hydocarbon cosolvent.

7. The composition of claim 1, wherein said aromatic hydrocarbon cosolvent has a flash point above about 150° F.

8. The composition of claim 1, wherein the weight ratio of water to aromatic hydrocarbon cosolvent is from about 30:1 to about 1.5:1.

9. The composition of claim 1, wherein said composition further comprises a second hydroxycarboxylic acid having the formula $C_nH_m(COOH)_xOH_y$ wherein n, x, and y are independently integers greater than 1 and m is equal to 2n+2−(x+y).

10. The composition of claim 9, wherein said second hydroxycarboxylic acid is glycolic acid.

11. The composition of claim 1, wherein said composition further comprises a peroxide generating agent.

12. The composition of claim 11, wherein said peroxide generating agent is selected from the group consisting of hydrogen peroxide, magnesium peroxide, and any combination of any of the foregoing.

13. The composition of claim 1, wherein said composition further comprises a coupling agent, stabilizer, chelating agent, corrosion inhibitor, rheology modifying agent, evaporation retardant, solubilizer-emulsifier, and any combination of any of the foregoing.

14. The composition of claim 13, wherein said coupling agent is selected from the group consisting of alkylene glycols, dimetlhylsulfoxide, and any combination of any of the foregoing.

15. The composition of claim 13, wherein said chelating agent is selected from the group consisting of phosphonic acids, citric acid, ethylenediamiinetetraacetic acid, and any combination of any of the foregoing.

16. The composition of claim 13, wherein said corrosion inhibitor is selected from the group consisting of benzotriazoles, borates, and any combination of any of the foregoing.

17. The composition of claim 13, wherein said rheology modifying agent is selected from the group consisting of hydroxypropyl cellulose, hydroxypropyl methyl cellulose, hydroxyethyl cellulose, fumed silica, precipitated silica, castor oil, and any combination of any of the foregoing.

18. The composition of claim 13, wherein said evaporation retardant is selected from the group consisting of silicone fluid, water-based wax emulsion, paraffin oil, paraffin wax, and any combination of any of the foregoing.

19. The composition of claim 13, wherein said solubilizer-emulsifier is a polyethoxylated sorbitan ester, trioleate polysorbate, or a fluorinated alkyl ester.

20. A method for removing paint or a coating from a substrate comprising applying a paint or coating removing effective amount of the aqueous paint stripper composition of claim 1.

21. The composition of claim 1, wherein said composition comprises from about 0.5 to about 5% by weight of malic acid.

22. The composition of claim 1, wherein said composition comprises from about 0.5 to about 3% by weight of malic acid.

* * * * *